United States Patent [19]

Washida et al.

[11] 4,413,831
[45] Nov. 8, 1983

[54] FACE SEAL WITH ELASTOMERIC AXIAL THRUST MEMBER

[75] Inventors: Akira Washida, Tateishi; Yuji Nakauchi, Sakura, both of Japan

[73] Assignee: Kabushiki Kaisha Arai Seisakusho, Tokyo, Japan

[21] Appl. No.: 455,907

[22] Filed: Jan. 6, 1983

[30] Foreign Application Priority Data

Jan. 9, 1982 [JP] Japan .................................. 57-1960

[51] Int. Cl.³ ............................................. F16J 15/38
[52] U.S. Cl. ....................................... 277/40; 277/83; 277/85; 277/92; 277/95; 277/177
[58] Field of Search ....................... 277/40, 41, 65, 83, 277/85, 92, 93 R, 93 SD, 95, 177

[56] References Cited

U.S. PATENT DOCUMENTS 2,950,932 8/1960 Gilbert ............................. 277/95 X
3,154,309 10/1964 Voitik ............................... 277/40 X

FOREIGN PATENT DOCUMENTS 618167 2/1949 United Kingdom .................. 277/65

*Primary Examiner*—Robert S. Ward, Jr.
*Attorney, Agent, or Firm*—Armstrong, Nikaido, Marmelstein & Kubovcik

[57] ABSTRACT

A shaft seal device for inhibiting any fluid flow through between two relatively rotating faces, for example, between a casing or the like stationary member and a rotary shaft or the like rotating member extending through the casing or the like stationary member. A cylindrical seal ring member made of elastomeric material is disposed between a rotary ring fluidtightly fitted onto the rotating member and a stationary ring fluidtightly fitted into the stationary member in such a manner that both the end faces thereof come in contact with the corresponding faces of the stationary member and the rotating member. The seal ring member has at least two annular grooves formed on its outer surface and ring-shaped resilient means are fitted into said annular grooves so that both the end faces of the seal ring member are forcibly thrusted against the corresponding faces of the rotary ring and the stationary ring under the influence of contractive force of the resilient means to thereby ensure fluidtightness therebetween. To reduce wearing due to the sliding contact between the end faces of the seal ring and the corresponding faces of the stationary and rotating members and thereby to improve the durability of the device a progressive seal ring made of fluororesin is fixedly secured to the end face of the rotary ring or the stationary ring.

4 Claims, 2 Drawing Figures

FACE SEAL WITH ELASTOMERIC AXIAL THRUST MEMBER

BACKGROUND OF THE INVENTION

The present invention relates to a shaft seal device for inhibiting any fluid flow through a space formed, for example, between a casing and a rotary shaft extending through the casing, and more particularly to a shaft seal device for inhibiting any fluid flow through between two relatively rotating faces such as the end faces of a rotary ring fitted onto the rotary shaft and of a stationary ring fitted into the casing.

DESCRIPTION OF THE PRIOR ART

As a hitherto known shaft seal device of the above-mentioned type a mechanical seal is generally used. There have been proposed a variety of mechanical seal rings which are basically constructed such that a rotary ring fitted onto a rotary shaft or the like rotating member in an axially slidable manner is thrusted by means of a spring located behind the rotary ring until the end face of the latter comes in tight contact with the end face of a stationary ring fitted into a casing or the like stationary member, whereby fluid-tightness is ensured between the end faces of the rotating and stationary rings while sliding contact is maintained at the contact area therebetween.

Since the rotary ring is loosely fitted onto the rotating member, there is necessity for disposing a sealing member on the latter. Further, since the spring is disposed so as to thrust the rotary ring in the axial direction, a large volume of axial space must be occupied by the spring.

SUMMARY OF THE INVENTION

Hence, it is an object of the present invention to provide a shaft seal device which ensures perfect fluid-tightness for inhibiting any fluid flow from the inside of the casing into the outside and vice versa without necessity for a wide space.

It is another object of the present invention to provide a shaft seal device which ensures fluid-tightness irrespective of any wearing caused on the slidable contact face which is rotatable relative to the stationary member.

According to the present invention, a cylindrical seal ring member is disposed between a rotary ring fluidtightly fitted onto the rotating member and a stationary ring fluidtightly fitted into the stationary member in such a manner that one of the end faces of the seal ring member comes in contact with the corresponding face of the rotary ring while the other end face comes in contact with the corresponding face of the stationary ring. The seal ring member is made of elastomeric material. Further, the seal ring member has at least two annular grooves formed on its outer surface and ring-shaped resilient means such as coil spring or the like are fitted around the annular grooves.

The contractive force of the ring-shaped resilient means is transformed into an axial force by means of which the seal ring member is elongated in the axial direction until both the end faces thereof are brought in tight contact against the corresponding end faces of the rotary ring and the stationary ring with a sufficiently high intensity of contact pressure. As a result fluid-tightness is achieved for inhibiting fluid leakage through between the end faces of the seal ring member and the corresponding faces of the rotary ring and the stationary ring. As the end faces of the seal ring member wear, the seal ring member is caused to axially elongate and thereby tight contact is still maintained between the end faces of the seal ring member and the corresponding faces of the rotary ring and the stationary ring without any danger of losing fluid-tightness.

In accordance with a preferred embodiment of the invention, a progressive seal ring made of fluororesin such as tetrafluoroethylene resin or the like material is fixedly secured to that end face of the seal ring member which slidably contacts the end face of the rotary ring or the stationary ring. Since the seal ring member is molded of synthetic rubber or the like material, the progressive seal ring may be thermally adhered to it during the molding operation. Owing to the arrangement of the progressive seal ring made of fluororesin at the end face of the seal ring member, frictional resistance active between the sealing end faces can be substantially reduced, resulting in extremely reduced wearing and improved durability.

In accordance with another embodiment of the invention, a progressive seal ring of the type mentioned is fixedly secured to the end face of the seal ring member in such a manner as to come in line contact with the opposing end face of the rotary or stationary ring with an inclined angle thereto. The result is that frictional resistance is further reduced while fluid-tightness is maintained.

The above and other objects, features and advantages of the present invention will become apparent from the reading of the following detailed description of preferred embodiments made in conjunction with the accompanying drwings.

BRIEF DESCRIPTION OF THE DRAWINGS

The accompanying drawings will be briefly described below.

DETAILED DESCRIPTION OF PREFERRED EMBODIMENTS

Now the present invention will be described in a greater detail with reference to the accompanying drawings which illustrate preferred embodiments of the invention.

Figure 1:
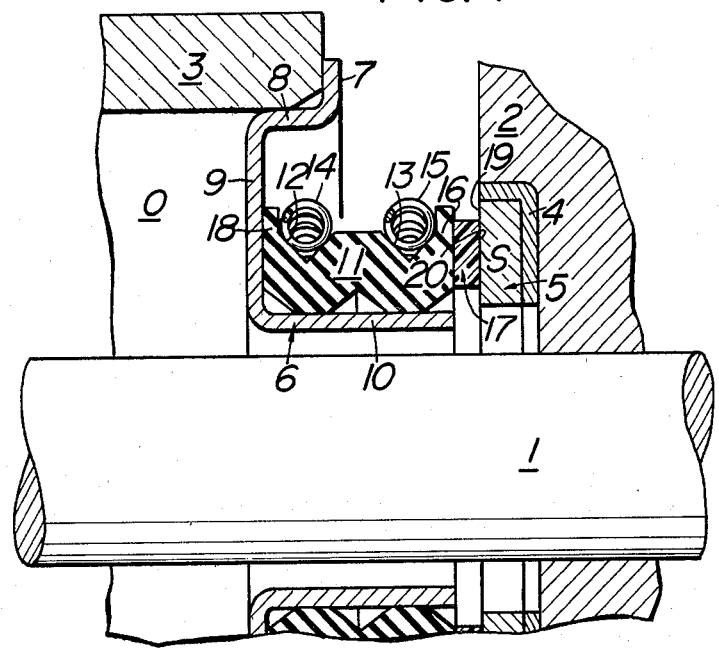
FIG. 1 is a vertical sectional view illustrating an essential part constituting a shaft seal device in accordance with an embodiment of the present invention.

Referring first to FIG. 1, a rotary shaft 1 includes a rotor 2 fluidtightly fitted thereto so as to be rotated together. The rotary shaft 1 extends through a bore O formed in a casing 3.

The rotor 2 has a recess formed on its end face located opposite to the casing 3 so that a rotary ring 5 is firmly fitted into the recess with a packing 4 interposed therebetween. Further, a stationary ring 6 is also firmly fitted into the inner wall of the bore O of the casing 3 in such a manner as to ensure fluid-tightness and inhibit its rotation relative to the casing 3. Specifically, the stationary ring 6 comprises a flange 7 adapted to fluidtightly abut against the end face of the casing 3, an outer sleeve 8 fluidtightly fitted into the inner wall of the casing 3, a side wall 9 exposed to the interior of the bore O and an inner sleeve 10 extending in parallel to the rotary shaft 1 with a considerably wide clearance maintained therebetween.

Onto the outer surface of the inner sleeve 10 of the stationary ring 6 is fitted a cylindrical seal ring 11 which is made of elastomeric material such as synthetic rubber or the like. The seal ring 11 has two annular grooves 12 and 13 formed on its outer surface each of which grooves has a V-shaped cross-sectional configuration. As is apparent from FIG. 1, the seal ring 11 has also another annular groove and corner cuts formed on its inner surface whereby it has a substantially W-shaped cross-sectional configuration.

Around the V-shaped annular grooves 12 and 13 are resiliently fitted coil springs 14 and 15 of a ring form. Since the coil springs 14 and 15 are mounted on the annular grooves by their radial expansion, the seal ring 11 is strained under the influence of the contractive force of the coil springs 14 and 15. Due to the structure of the seal ring 11 as described above it is subjected to a combination of the radial force and the axial force, the former force being effective in reducing the diameter of the seal ring, while the latter force being effective in elongating it in the axial direction.

Further, the seal ring 11 has a progressive seal ring 17 fixedly secured thereto at the end part 16 located opposite to the rotor 2. The progressive seal ring 17 is typically made of tetrafluoroethylene resin with filler filled therein and it is thermally adhered to the seal ring 11 when the latter is molded. The other end part 18 of the seal ring 11 located in the casing 3 is adapted to come in tight contact with the side wall 9 of the stationary ring 6.

As shown in FIG. 1, both the end face 19 of the rotary ring 5 and the end face 20 of the progressive seal ring 17 extend in the radial direction at a right angle relative to the axis of the rotary shaft 1. As the seal ring 11 is strained inwardly in the radial direction under the contractive force of the coil springs 14 and 15, the end part 16 of the seal ring 11 becomes effective in thrusting the progressive seal ring 17 toward the rotary ring 5 until both the end faces 19 and 20 are brought in tight contact with one another. Further, the end part 18 of the seal ring 11 is thrusted against the side wall 9 of the stationary ring 6 so that fluid-tightness is ensured therebetween. At the same time the inner surface of the seal ring 11 is thrusted against the outer surface of the inner sleeve 10 of the stationary ring 6 so that fluid-tightness is ensured also therebetween.

As the rotary shaft 1 is rotated, the rotor 2 and the rotary ring 5 are caused to rotate together with the rotary shaft 1. On the other hand, the progressive seal ring 17 is kept so as not to be substantially rotated due to the arrangement that it is fixedly secured to the seal ring 11 which is in turn brought in tight contact with the stationary ring 6 firmly fitted into the casing 3. Thus, though the end face 19 of the rotary ring 5 is rotatable relative to the end face 20 of the progressive seal ring 17, no fluid leakage takes place at the end faces 19 and 20, because they are brought in fluidtight sliding contact with one another under the influence of the contractive force created by the coil springs 14 and 15. As a result a slidable seal face S is constituted in cooperation of the end faces 19 and 20.

The seal face S wears increasingly as sliding operation continues. However, since the end part 16 of the seal ring 11 is normally thrusted toward the end face 19 in the axial direction under the influence of the resilient force of the coil springs 14 and 15, the progressive seal ring 17 is caused to move toward the rotary ring 5 whereby the seal face S can be kept in the tight contact state.

Figure 2:
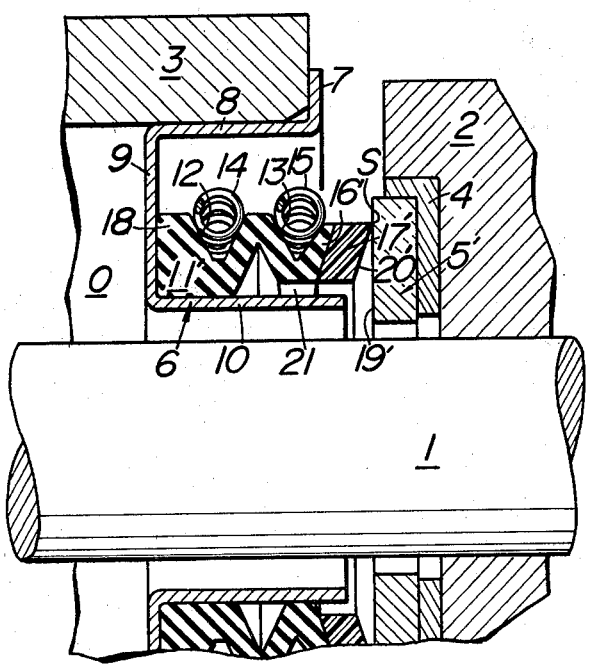
FIG. 2 is a vertical sectional view illustrating an essential part constituting a shaft seal device in accordance with another embodiment of the present invention.

Next, FIG. 2 illustrates a modified embodiment of the present invention and the same or similar members and parts as those in the preceding embodiment as illustrated in FIG. 1 are identified with the same reference numerals. Thus, their repeated description will be not required.

Referring to FIG. 2, the rotary ring 5′ is made of ceramic material. The rotary ring 5′ is rotated together with the rotary shaft 1 and the rotor 2 in the same manner as in FIG. 1.

The seal ring 11′ has a progressive seal ring 17′ fixedly secured thereto as its end part 16′ located opposite to the rotary ring 5′, said progressive seal ring 17′ being made of tetrafluoroethylene resin. It should be noted that the end face 20′ of the progressive seal ring 17′ extends at a certain inciination angle relative to the end face 19′ of the rotary ring 5′ so that the progressive seal ring 17′ comes only in contact with the end face 19′ at the radially outermost peripheral edge thereof. This causes the progressive seal ring 17′ to come in line contact with the rotary ring 5′, resulting in reduced frictional resistance generated during rotating movement of the latter while it comes in sliding contact with the former. The wedge-shaped space formed between both the end faces 19′ and 20′ serves as a lubricant storage, providing further reduction of frictional force, less wearing and improved durability.

In this modified embodiment, the seal ring 11′ has a plurality of axially extending grooves 21 formed on its inner wall located adjacent to the rotary ring 5′, said grooves 21 being arranged in an equally spaced relation to one another in the peripheral direction. The arrangement of the grooves 21 makes it easier to displace the end face 16′ of the seal ring 11′ toward the rotary ring 5′ under the compressive force imparted by the coil springs 14 and 15 as the progressive seal ring 17′ wears.

As will be readily understood from the above description, the shaft seal device in accordance with the present invention is constructed such that the optimum thrust force is developed between the one end face of the seal ring and the end face of the rotary ring as well as between the other end face of the seal ring and the end face of the stationary ring with the aid of resilient means such as ring-shaped coil spring or the like. Thus, the shaft seal device requires an axial space smaller than that of conventional mechanical seal using an axially acting spring means. Further, the seal ring has at least two annular grooves formed on the outer surface for easily flexing so that the shaft seal device has an increased axial elongation as well as an increased allowable amount of wearing and thereby a certain amount of axial error caused during assembling operation is readily corrected. It should be added that the shaft seal device is easily assembled on the rotary shaft.

Further, due to the excellent flexibility of the seal ring, sufficiently high sealing pressure is obtainable even with a relatively soft ring-shaped resilient means and moreover the whole shaft seal device can be constructed in a small size by employing the ring-shaped resilient means having small dimensions.

While the present invention has been described merely with respect to the illustrated embodiments, it should be of cource understood that the invention should be not limited only to them but various changes or modifications may be made within the scope as defined in the appended claims.

What is claimed is:

1. A shaft seal device essentially comprising:
    a rotary ring fluidtightly fitted onto a rotating member;
    a stationary ring fluidtightly fitted into a stationary member;
    a cylindrical seal ring member made of elastomeric material, said seal ring member being mounted around an inner sleeve portion of said stationary ring and having at least two annular grooves formed on the outer surface thereof, one of both the end faces of the seal ring member being brought into contact with the corresponding end face of the rotary ring, while the other one end face being brought into contact with a wall portion of the stationary ring; and
    ring-shaped resilient means fitted into said annular grooves on the seal ring so as to elongate the seal ring in the axial direction under the influence of contractive force caused by means of said resillient means whereby both the end faces of the seal ring member are placed in tight contact against the corresponding faces of the rotary and stationary rings.

2. A shaft seal device as defined in claim 1, wherein the seal ring member has a progressive seal ring fixedly secured to the one end face thereof against which the rotary ring or the stationary ring is brought in sliding contact, said progressive seal ring being made of fluororesin such as tetrafluoroethylene resin or the like material.

3. A shaft seal device as defined in claim 2, wherein the end face of the progressive seal ring is inclined at a certain angle to the opposite end face of the rotary or stationary ring against which the end face of the progressive seal ring is brought in sliding contact.

4. A shaft seal device as defined in claim 1, wherein the rotary ring is made of ceramic material.

* * * * *